April 2, 1968     E. LOEB     3,375,728

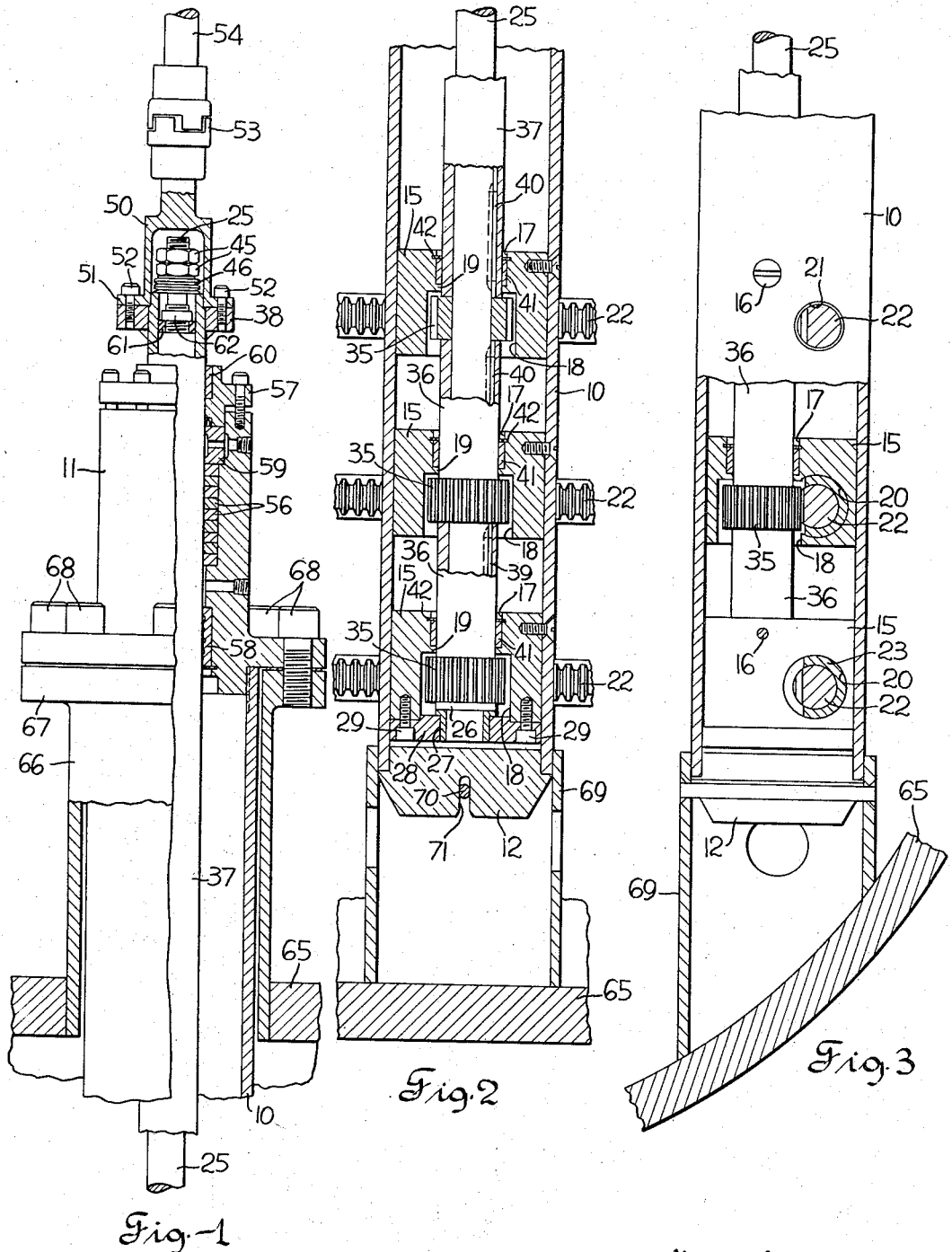

GANG TYPE CONTROL ROD DRIVE

Filed Dec. 13, 1965     2 Sheets-Sheet 2

Inventor
Ernest Loeb
By Forest C. Sexton
Attorney

United States Patent Office 3,375,728
Patented Apr. 2, 1968

3,375,728
GANG TYPE CONTROL ROD DRIVE
Ernest Loeb, Silver Spring, Md., assignor to Allis-Chalmers Manufacturing Company, Milwaukee, Wis.
Filed Dec. 13, 1965, Ser. No. 513,243
6 Claims. (Cl. 74—422)

This invention relates generally to a control rod drive apparatus for nuclear reactors. More specifically, this invention relates to a new and improved gang type control rod drive apparatus for the simultaneous movement of a plurality of control rods, utilizing a slip clutch or friction drive mechanism to eliminate the potential hazards in gang type drives should a control rod jam or stick.

The core of a typical nuclear reactor usually comprises a plurality of elongated fuel assemblies and a plurality of elongated control rods all vertically disposed in a close packed configuration. The fuel assemblies usually comprise one or more metallic tubes or plates which encase the fissile fuels, and provide for coolant passage through the assembly adjacent to the encased fuel. The control rods are usually solid and contain or comprise a neutron absorbing material. A moderator must of course, be provided to slow the fast fission product neutrons to thermal energies to promote the fission reaction. In many reactors, the moderator and coolant are one and the same.

During operation of the reactor, the fuel assemblies are usually held rigidly in position by a hold-down or clamping means, while the control rods are secured to a driving mechanism which can raise or lower the control rods relative to the core to control the output of the reactor. Thus, when the control rods are fully inserted into the reactor core, their neutron absorbing characteristic will prevent a chain reaction from progressing. As the control rods are progressively withdrawn from the core, progressively less volume of the neutron absorber is present, and accordingly more neutrons will effect a fission reaction. At some point in the withdrawal, a chain reaction will progress. From this point on, the reactivity, or power level, of the reactor can be controlled by adjusting the position of the control rods relative to the core. To increase the power level, the control rods are further withdrawn, and to reduce the power level, the control rods are partially reinserted. To shut the reactor down completely, the control rods are completely reinserted into the core.

It is apparent therefore, that because the power level of the reactor is varied by the reciprocal motion of the control rods, the reliability and accuracy of the control rod drive means are extremely critical. As a result, the control rod drive mechanisms of the prior art have developed into rather complex and intricate machines, being either mechanically or hydraulically actuated.

Although the control rods are usually operated simultaneously, whereby a single gang type drive would be economical, very few developments have been made in gang type drives. Almost always, the control rods are each actuated by an individual drive mechanism. This has been deemed, in most situations, to be a necessary safeguard because of the critical nature of the control rod movement. That is, if more than one control rod is actuated by a single drive, a potential hazard results from the fact that the proper movement of all control rods is dependent upon each control rod to function properly. If one of the control rods on the gang drive should jam or stick, all the other control rods on that drive would be rendered inoperative. Therefore, as a safety consideration, the most common practice has been to provide an individual driving means for each individual control rod, despite the obvious disadvantage of added costs.

In addition to the cost disadvantages, the use of an individual control rod drive means for each control rod leads to further disadvantages. For example, space limitations above or below the reactor may pose substantial problems in placing the drive mechanisms. That is to say, the volume above or below the reactor, where the control rod drive means must be disposed, is limited. Therefore, this space may become somewhat congested when individual control rod drive means are provided for each control rod. Furthermore, reactor shutdown time may be unduly extended because of the large number of control rod drive means which must be removed to provide access to the core.

Another disadvantage of individual control rod drives is that a vessel penetration must be provided for each control rod. The provision of such vessel penetrations, and the pressure seals therewith, is a significant factor in vessel design and cost. It should also be apparent that the greater the number of vessel penetrations, the greater are the chances for pressure leaks, thus adversely affecting reliability.

It appears that the above disadvantages will be compounded in the future, since the future outlook for nuclear reactors indicates that there will be a strong trend toward larger reactors on orders of 600 to 1,000 megawatts or more. Present design studies reveal that in a 600 mw. reactor, it will be necessary to provide as many as 150 control rods. It is obvious therefore, that cost and space problems will be greatly multiplied when such reactors are constructed. In fact, it may be absolutely necessary in such reactors to use gang type drives because of the space limitations, or because of the excessive number of vessel penetrations that would otherwise be necessary.

This invention is predicated upon the conception and development of a new and improved, mechanical gang type control rod drive apparatus whereby the control rods are actuated by adjustable slip clutch mechanisms so that in the event one or more control rods should jam or stick, the other control rods on the gang drive will still function properly. Furthermore, this control rod drive apparatus utilizes a simple rack and pinion type of drive to permit the use of the more reliable rotary type pressure seals which are available commercially.

Accordingly, it is a primary object of this invention to provide a new and improved control rod drive means which will obviate the above described disadvantages.

It is another primary object of this invention to provide an inherently fail-safe gang type control rod drive apparatus.

It is still another primary object of this invention to provide a gang type control rod drive apparatus utilizing a slip clutch, friction drive to assure actuation of all free control rods on the gang drive in the event other control rods should become jammed or stuck.

It is yet another primary object of this invention to provide a simple and inexpensive gang type control rod drive apparatus utilizing a rack and pinion type of drive permitting the use of the more reliable rotary pressure seals.

It is a further primary object of this invention to provide an inexpensive, mechanical, gang type control rod drive apparatus of space conserving dimensions.

It is still a further primary object of this invention to provide a gang type control rod drive apparatus which will reduce the number of necessary vessel penetrations and pressure seals associated therewith.

These and other objects and advantages are fulfilled by this invention as will become apparent from a full understanding of the following detailed description and accompanying drawings of which:

FIG. 1 is a longitudinal side view, in partial section, of the upper portion of a gang type control rod drive constructed in accordance with this invention;

FIG. 2 is a longitudinal side view, in section, of the lower portion of a gang type control rod drive apparatus shown in FIG. 1;

FIG. 3 is a longitudinal side view, in partial section, of the view shown in FIG. 2;

Figures 4, 5:
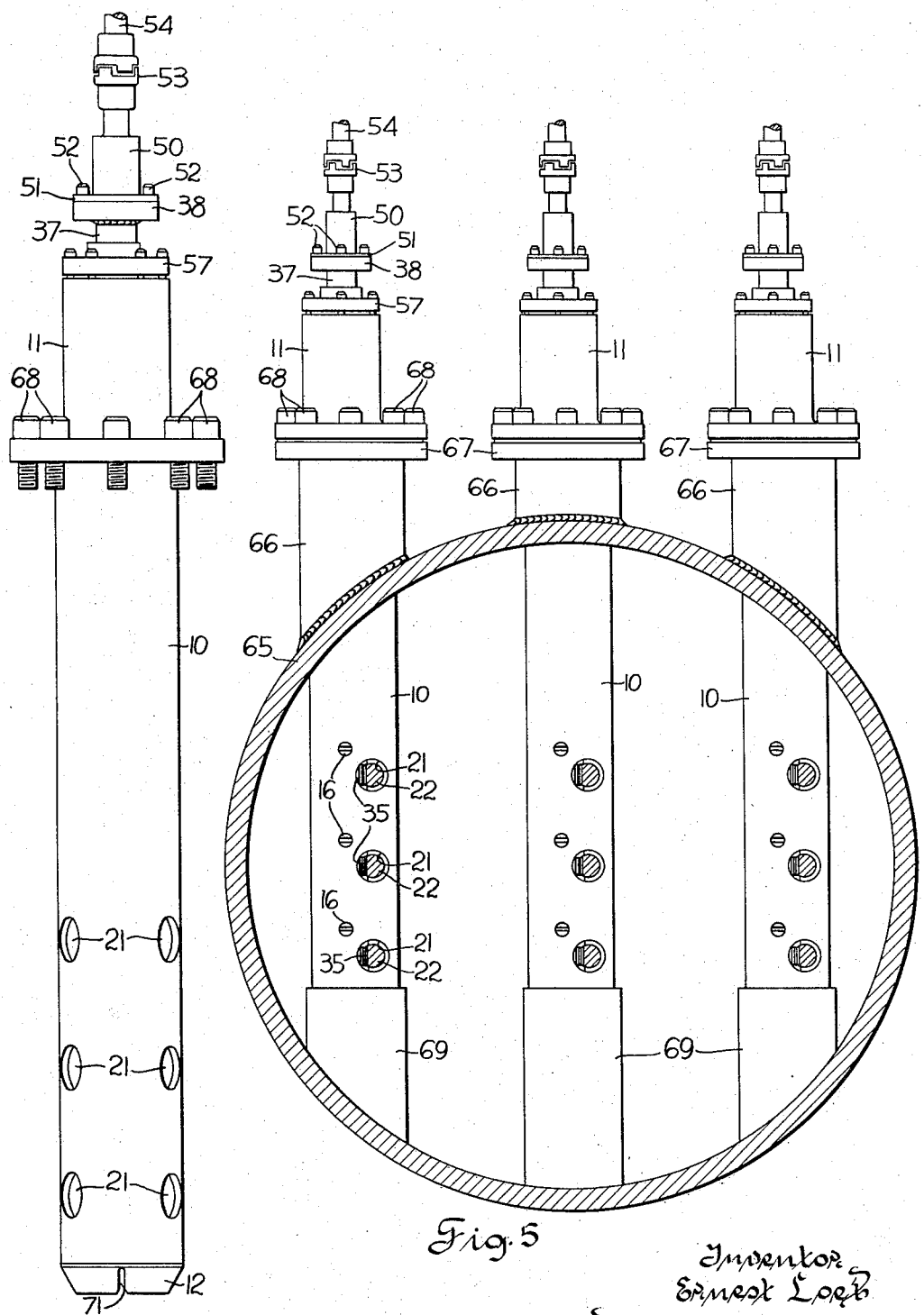
FIG. 4 is a longitudinal side view of the entire control rod drive apparatus shown in parts in FIGS. 1, 2 and 3.
FIG. 5 is a cutaway view of a reactor vessel or vessel extension showing three such gang type control rod drives in position.

It should be noted that FIG. 2 is the lower extension of FIG. 1 so that these two figures show one elongated gang type control rod drive apparatus in partial section. FIG. 1 shows the upper portion or that portion which would be outside the reactor vessel, while FIG. 2 shows the lower portion or that portion inside the reactor vessel. FIG. 3 on the other hand, is a side view only of that portion shown in FIG. 2.

Referring to the drawings, and particularly to FIGS. 1, 2 and 3, one embodiment of the control rod drive apparatus of this invention comprises an elongated tubular housing 10 with a pressure seal housing 11 secured to the upper open end thereof. A suitable end plug 12 is secured to the lower end of tubular housing 10.

A plurality of cylindrical bearing blocks 15 are closely fitted within the tubular housing 10, being held in position by any means such as screws 16. Each bearing block 15 is provided with a cylindrical bore 17 through the upper surface thereof which mates axially with a counterbore or socket 18 of a larger diameter through the lower surface thereof. The axis of the two bores 17 and 18 are coincident with, or parallel to the axis of the tubular housing 10. A lip or inner flange 19 may be provided between the two bores 17 and 18. Each bearing block 15 is also provided with a cylindrical, off-center bore 20 passing through each block 15 perpendicular to a plane through the axis of block 15 and tubular housing 10, and partially intersecting bore 18. Each bore 20, in bearing block 15, mates with off-center holes 21 through opposing surfaces in said tubular housing 10. The bores 20 and holes 21 receive the control rod drive racks 22 which are each secured in lengthwise relation to one end of a control rod (not shown). Slide bushings 23 should be provided within bores 20 to provide smooth sliding surfaces for the drive racks 22. Although the drawings show only three bearing blocks 15, it should be understood that the number used will be equal to the number of control rods to be operated by the drive mechanism.

An elongated solid shaft 25, being reduced and threaded at one end and having a flange 26 at the other end, is axially disposed within the tubular housing 10 and pressure seal housing 11, passing axially through bores 17 and 18 on bearing blocks 15. Flange 26, on shaft 25, rests against a thrust bushing 27 seated in circular plate 28. Plate 28 is secured under the lowermost bearing block by any means such as bolts 29. Accordingly, shaft 25, disposed within bores 17 and 18 extends transversely to control rod drive racks 22 disposed within bores 20.

A plurality of pinion gears 35 are axially disposed within bores 18 being rotatably fitted onto shaft 25, but are not keyed or otherwise secured thereto. That is, shaft 25 must be free to rotate within pinion gears 35. The lowermost pinion gear is supported by flange 26, while the other pinion gears are spaced apart thereabove by sleeves 36 which are concentrically disposed around shaft 25 and engage the flat surfaces of pinion gears 35 respectively. An upper sleeve 37, having a flange 38 at the top thereof, is similarly provided above the uppermost pinion gear concentrically disposed on shaft 25. The lower portions of sleeves 36 and 37 are fitted within bores 17 in blocks 15. Sleeves 36 and 37 are slidably secured to shaft 25 by any means such as keys 39 and 40 respectively. Therefore, sleeves 36 and 37 must turn with shaft 25, but the pinion gears 35 are free turning. However, when the sleeves 36 and 37 and flange 26 are tightly secured against the pinion gears 35 respectively, said pinion gears 35 will turn with shaft 25 and sleeves 36 and 37, unless the resistance to turning exceeds the frictional forces exerted. That is, any torque in the rotatable sleeves 36 and 37 and flange 26 are transmitted to the pinion gears 35 by the frictional forces therebetween. When one or more pinion gears 35 will not turn, the shaft 25 and sleeves 36 and 37 will still turn to activate the free pinion gears 35. Thus, the sleeves 36 and 37 and flange 26 act as slip clutches against the pinion gears 35.

A plurality of cylindrical bushings 41 are tightly disposed within bores 17 on bearing blocks 15 to provide a bearing surface for rotating sleeves 36 and 37 therein. Lock rings 42 may be provided to hold the bushings 41 in place against flanges 19.

A pair of adjusting nuts 45 are threaded onto the threaded end of shaft 25, bracing a compression spring 46 against the upper edge of sleeve 37. For example, commercially available Bellville springs, as shown in the drawings, are ideal. Thus, the pressure of the sleeves 36 and 37, are flange 26 on the pinion gears 35 can be varied by the adjusting nuts 45. The nuts 45 act against the compression spring or Belleville springs, as shown in the drawings, are ideal. Thus, the pressure of the sleeves 36 and 37, and flange 26 on the pinion gears 35 can be varied by the adjusting nuts 45. The nuts 45 act against the compression spring or Belleville springs 46 to place the sleeves 36 and 37 in compression against the pinion gears 35, and placing the shaft 25 in tension with flange 26 pulling upward against the lowermost pinion gear.

A socket 50, having a flange 51 is secured to flange 38 on shaft 25 by any means such as bolts 52, in such a manner that socket 50 is disposed over the adjusting nuts 45 and Belleville springs 46. A coupling 53 may be used to join socket 50 to a torque transmitting means 54 which is rotatable in either direction by a drive means such as an electric motor (not shown). Thus, the torque transmitting means 54 will serve to rotate coupling 53 and socket 50, to in turn rotate shaft 25, sleeves 36 and 37 and pinion gears 35.

Within the pressure seal housing 11, a set of rotary type pressure seals 56 are provided to prevent pressure leaks along the outside of rotatable sleeve 37. Since such pressure seals are well known, they will not be further described here. The pressure seals 56 are held in place by the pressure seal housing cover 57. Bushings 58 and 59 should be disposed within the pressure seal housing 11, on either side of the pressure seals 56, to provide bearing surfaces for the rotatable sleeve 37. Similarly, a bushing 60 may be provided in cover 57. A pressure seal 61 must also be provided near the upper end of shaft 25 to prevent pressure leakage between shaft 25 and sleeve 37. The pressure seal 61 is tightened by threaded ring 62 on shaft 25.

The entire drive assembly as described above is shown in FIG. 4 as it would appear removed from the nuclear reactor. FIG. 5 illustrates how three such assemblies might be used in a nuclear reactor to operate three control rods each. It should be apparent therefore, that the control rod extensions 22 need not penetrate the reactor vessel. Thus, in the embodiment shown in FIG. 5, only three vessel penetrations are made in controlling nine control rods. In larger reactors, it would of course be desirable to activate more than three control rods by a single drive apparatus to even more greatly reduce the proportion number of vessel penetrations.

To secure the control rod drive assemblies described above to a nuclear reactor, the reactor vessel 65 should extend somewhat above or below the core (not shown). The extended portion of vessel 65 should be provided with nozzles 66, having flanges 67, secured thereto with its axis perpendicular to the control rod line of travel. The tubular housing 10 should be insertable into a nozzle 66 and secured thereto by any means such as bolts 68 which hold the pressure seal housing 11 to flange 67. Some means such as socket 69 should be provided within the reactor vessel 65 to receive the lower end of housing 10 and end plug 12. Preferably, the lower end of the tubular housing 10 should be rigidly secured to eliminate any possible torque forces therein. This could be done by providing a non-round socket 69 such as will prevent the tubular housing 10 from rotating therein, or by providing a lock pin 70 as shown which engages slot 71 on end plug 12.

The control rod drive racks 22 are inserted through holes 21 on the tubular housing 10 and bores 20 through bearing blocks 15 such that the teeth on racks 22 will mesh with the teeth on pinion gears 35.

In operation, the external driving means (not shown) such as an electric motor, can be activated to rotate the shaft 25 and sleeves 36 and 37. If the adjusting nuts 45 are sufficiently tightened onto the Belleville springs 46, the frictional forces between the sleeves 36 and 37 and the pinion gears 35 will force the pinion gears 35 to rotate therewith causing a reciprocal motion in the control rod drive racks 22. The control rods (not shown), being secured to the ends of the control rod drive racks 22, can therefore be pulled from or pushed into the reactor core (not shown) as necessary for the control of the reactor. In the event any one or more of the control rods should become jammed or stuck so that the individual pinion gear therefor is held fast, the shaft 25 and sleeves 36 and 37 will still be able to turn to operate the other free pinion gears on the drive. The sleeves 36 and 37 are keyed to shaft 25 to prevent any interaction between adjacent pinion gears 35 in the event one or more of said pinion gears will not turn.

As described above, the pressure, or frictional forces, of sleeves 36 and 37 on the pinion gears 35 can be varied by the adjusting nuts 45. Therefore, by a proper adjustment, any slight or moderate sticking of the control rods can be overcome. Thus, adjusting nuts 45 should be tightened sufficiently to overcome the ordinary frictional forces in the control rod system, but not so tight as will cause the entire system to become inoperative if one or more control rods should become completely stuck or jammed.

One particularly desirable feature of the embodiment described above is that it will permit access to the adjusting nut 45 without completely depressurizing the reactor. This feature results from the fact that the adjusting nut is outside the reactor vessel and the pressure seal 61 has been placed below the Belleville springs 46. Thus, it should be noted that although the seal between the shaft 25 and the inner sleeve walls could be effected by a suitable gasket seal between flanges 38 and 51, this would destroy accessibility to the adjusting nuts 45 without depressurizing the reactor.

In an actual installation, it may be desirable to utilize the gang type drive as described above only for normal reactor operations, and to provide a pneumatic fast scram actuator on a standby basis. During normal reactor operations, a means could be provided to vent both ends of the pneumatic cylinder to permit the plunger to freely follow the control rod drive rack when actuated by the mechanism described herein. In case of emergency, the vents could be closed so that the pneumatic drive could rapidly push the control rods to the scram position.

In some installations it may be desirable to use a combination of single and gang type control rod drives. For example, safety considerations may require the use of individual control rod drives on high-worth control rods, and yet permit the use of gang type control rod drives as described above, on low-worth control rods.

It should be apparent that many modifications could be made in the control rod drive apparatus detailed above without departing from the basic concept. Accordingly, this invention should not be limited to the details given herein, but may be modified within the scope of the appending claims.

The embodiments of the invention in which an exclusive property or privilege is claimed are defined as follows:

1. A control rod drive apparatus for use with a nuclear reactor for the simultaneous movement of a plurality of control rods, comprising in combination a plurality of control rod drive racks secured in lengthwise relation to said control rods respectively, a shaft rotatably mounted to extend transversely of said control rod drive racks, a plurality of pinion gears rotatably mounted onto said shaft in meshing engagement respectively, with said control rod drive racks, torque transmitting means connected to said shaft to selectively rotate said shaft in either direction, and slip clutch means on said shaft to frictionally engage said pinion gears in such manner as will cause said pinion gears to rotate therewith unless the resistance to rotation exceeds the frictional forces exerted.

2. The control rod drive apparatus described in claim 1 wherein said slip clutch means on said shaft to frictionally engage said pinion gears comprises a flange fixedly secured to the lower end of said shaft to frictionally engage the undersurface of the lowermost pinion gear in a torque transmitting relationship; and a plurality of sleeves, each concentrically disposed and keyed onto said shaft on either side of the remaining pinion gears respectively in such a manner as the edges thereof frictionally engage the flat surfaces of said pinion gears in a torque transmitting relationship.

3. The control rod drive apparatus described in claim 2 additionally comprising adjusting means on said shaft to adjustably tighten said sleeves and said flange against said pinion gears.

4. The control rod drive apparatus described in claim 3 wherein said adjusting means comprises a compression spring resting upon the upper edge of the uppermost sleeve, and an adjusting nut threaded onto the upper end of said shaft in a force transmitting relationship against said compression spring.

5. The control rod drive apparatus described in claim 4 additionally comprising an elongated tubular housing disposed about said pinion gears, with the upper ends of said shaft and the uppermost sleeve protruding therefrom; a pressure seal disposed between said housing and the uppermost sleeve, a pressure seal between said shaft and the uppermost sleeve, and a plurality of holes in said tubular housing to admit said control rod drive racks in a meshing engagement with said pinion gears.

6. The control rod drive apparatus described in claim 5 additionally comprising a plurality of bearing blocks rigidly disposed within said tubular housing having bores therethrough to provide bearing surfaces for said rotatable sleeves and said control rod drive racks.

References Cited
UNITED STATES PATENTS

| | | | |
|---|---|---|---|
| 333,822 | 1/1886 | Bradley | 64—30 X |
| 396,642 | 1/1889 | Ball | 64—30 |
| 3,083,658 | 4/1963 | Winberg | 64—30 |
| 3,162,579 | 12/1964 | Thomas et al. | 176—36 |
| 3,226,951 | 1/1966 | De Mallie et al. | 64—30 |
| 3,257,287 | 6/1966 | Good | 74—422 X |
| 3,309,278 | 3/1967 | Dickson | 176—36 |

FRED C. MATTERN, Jr., *Primary Examiner.*

DONLEY J. STOCKING, *Examiner.*

L. H. GERIN, *Assistant Examiner.*